United States Patent [19]

Ordanic et al.

[11] Patent Number: 5,751,964

[45] Date of Patent: May 12, 1998

[54] SYSTEM AND METHOD FOR AUTOMATIC DETERMINATION OF THRESHOLDS IN NETWORK MANAGEMENT

[75] Inventors: Zvonimir Ordanic, Raleigh; David John Spitz, Cary, both of N.C.

[73] Assignee: International Business Machines Corporation, Armonk, N.Y.

[21] Appl. No.: 526,829

[22] Filed: Sep. 12, 1995

[51] Int. Cl.⁶ ............................................. G06F 11/30
[52] U.S. Cl. .............. 395/200.54; 395/118; 395/551.01; 370/241; 370/229
[58] Field of Search ............................... 395/182, 117, 395/161; 364/413, 514; 340/146, 825; 370/229, 241

[56] References Cited

U.S. PATENT DOCUMENTS

| | | | |
|---|---|---|---|
| 4,080,589 | 3/1978 | Kline | 340/146.1 |
| 4,291,403 | 9/1981 | Waddill et al. | 371/5 |
| 4,339,657 | 7/1982 | Larson et al. | 235/92 |
| 4,751,730 | 6/1988 | Galand | 379/410 |
| 4,769,761 | 9/1988 | Downes et al. | 364/514 |
| 4,793,813 | 12/1988 | Bitzer et al. | 434/335 |
| 4,847,865 | 7/1989 | Larson | 375/76 |
| 4,926,442 | 5/1990 | Bukowski et al. | 375/76 |
| 5,223,827 | 6/1993 | Bell et al. | 340/825.06 |
| 5,283,879 | 2/1994 | Carteau et al. | 395/425 |
| 5,291,400 | 3/1994 | Gilham | 364/413.06 |
| 5,301,323 | 4/1994 | Maerer et al. | 395/650 |
| 5,331,642 | 7/1994 | Valley et al. | 371/5.2 |
| 5,337,373 | 8/1994 | Marandici et al. | 382/51 |
| 5,361,252 | 11/1994 | Sallberg et al. | 370/17 |
| 5,375,177 | 12/1994 | Vaidyanathan et al. | 382/48 |
| 5,470,218 | 11/1995 | Hillman et al. | 425/144 |
| 5,483,468 | 1/1996 | Chen et al. | 395/117 |
| 5,544,303 | 8/1996 | Maroteaux et al. | 395/161 |
| 5,553,235 | 9/1996 | Chen et al. | 395/182.18 |
| 5,559,955 | 9/1996 | Dev et al. | 395/182.02 |
| 5,615,323 | 3/1997 | Engel et al. | 395/140 |
| 5,634,008 | 5/1997 | Gaffaney et al. | 395/200.11 |
| 5,673,197 | 9/1997 | Keba et al. | 364/487 |

*Primary Examiner*—Christopher B. Shin
*Attorney, Agent, or Firm*—John J. Timar

[57] ABSTRACT

Method and system for automatically determining and updating thresholds based on collected data samples for counter variables being monitored by a network management application. Historical data is accumulated and used to determine the mean and standard deviation of the monitored counter variables based on the aggregated sample values and a threshold factor is applied to the standard deviation and the resulting value added to the mean to establish the threshold value. The threshold value, which is adaptively updated, is used to determine whether the subsequently sampled values of the monitored counter variables are within a normal range, or that a potential problem exists requiring intervention by a network operator.

14 Claims, 5 Drawing Sheets

SYSTEM AND METHOD FOR AUTOMATIC DETERMINATION OF THRESHOLDS IN NETWORK MANAGEMENT

BACKGROUND OF THE INVENTION

Network management applications often determine conditions in the network by monitoring particular streams of data, such as Management Information Base (MIB) counters, gauges, and network node states. Typically, to determine whether or not a problem exists, these applications apply thresholds to the rates of change in such counters, or to the values received in gauges. A threshold is a specified number of occurrences of an event within a specified time period which becomes the triggering event for the performance of particular actions, such as initiating specific recovery procedures for a failed device in the network. Currently, the application user is expected to manually determine and set such thresholds.

However, this current method of having the user manually determine and set thresholds poses two serious problems which significantly impact the usability of such an application.

First, the user is not familiar enough with the meaning of specific counters or gauges to be able to decide what a reasonable threshold should be. Although some counters and gauges are well-known and standardized, there is a significant number of obscure and non-standard counters and gauges. Typically, then, the user will disable the monitoring of such data in the application due to lack of understanding (a loss of potentially useful information), or will be forced to investigate the meaning and usage of the data to be able to determine a reasonable threshold (a loss of productivity), or, in the worst case, will be forced to collect statistical data about every counter or gauge in question to manually determine a reasonable threshold (such statistical data could take days to collect).

Second, it is typically the case that each node in the network to be managed can generate hundreds of different counters and gauges. If every counter and gauge has a separate threshold (or set of thresholds), this implies that there are hundreds of thresholds to be set for each node, and, therefore, potentially thousands of thresholds to be set for a managed network. Clearly, such a task is tedious, time consuming, and, therefore, error prone when placed upon the application user.

These two problems with manual threshold determination, when combined, significantly impact the usability of a network management application. The more heavily the application depends on thresholding as a means of problem determination, the more serious the degradation in usability becomes.

In general, event counting and thresholding are well known in the computing and networking arts. In U.S. Pat. No. 4,080,589, the occurrence of an error triggers a timer and begins a counting interval. Subsequent errors occurring during the interval are counted until a predetermined threshold is reached or the timing interval expires. An alarm is signalled and the timer is reset if the threshold is reached before expiration of the time interval. In U.S. Pat. No. 4,291,403, if the error count exceeds the predetermined threshold during an established time period, an alarm is generated and a second threshold is established to measure subsequent error rates. In U.S. Pat. No. 4,339,657, a variable time interval is established that is measured by the occurrence of a predetermined number of operations. The arrangement counts errors occurring during the operations and also counts the number of times that the error count crosses a predetermined threshold.

U.S. Pat. No. 5,223,827, having the same assignee as the present invention, improves on other prior art by providing a mechanism for managing network event counters that enables the accumulation of information that can be manipulated to provide a variety of performance measurements. It makes use of an event counter, a sliding event threshold counter, and a sliding interval counter for detection of an event threshold that requires performance of some type of action in response.

While the known art is useful in many instances, particularly with respect to determining when predetermined thresholds have been reached, the art does not provide a system or method for automatically determining threshold conditions to associate with the use of gauges or counters in network management applications. The present invention improves on prior art techniques by automatically determining threshold conditions for a multiplicity of counters or gauges corresponding to particular data streams.

SUMMARY OF THE INVENTION

It is an object of the invention to provide a more efficient system and method for automatically determining and setting thresholds for event counters and gauges in a communications network without intervention by a network management application user.

It is a further object of this invention to provide a system and method for automatically determining and adaptively updating thresholds based on data samples.

It is still a further object of this invention to provide a system and method that enables the user to selectively enable or disable automatic thresholding for individual variables that are being monitored at a network node.

These and other objects and advantages are accomplished by the present invention in which information for every variable being monitored is stored by the network management application to collect historical behavior for use in determining and updating a threshold for each monitored variable. To determine if the collected variables or counters are within a normal range, the mean and standard deviation are determined each time the monitored variable is sampled and a range factor is applied to this statistical data to establish the threshold or set of thresholds for the monitored variable.

Historical data is updated whenever the variable is sampled, so that the threshold is continuously adapting to recent trends in the behavior of the variable. The network operator or user can select automatic monitoring and thresholding of entire sets of variables, or can alternatively enable and disable monitoring for individual variables. The invention further enables the user to disable automatic thresholding at any time which results in individual thresholds being frozen at their current levels.

BRIEF DESCRIPTION OF THE DRAWINGS

This invention will be described with respect to a preferred embodiment thereof which is further illustrated and described in the drawings.

DETAILED DESCRIPTION OF THE PREFERRED EMBODIMENT

The invention finds its application in present day complex heterogeneous communications and data processing networks in which a variety of devices or products are managed by network management applications which, in turn, are monitored by network control operators. In this heterogeneous computing environment, use of local area networks (LANs) containing numerous and varied personal computers and workstations is widespread. A corporate computing environment may contain several LANs at a single site connected by bridges, or LANs at several different sites connected by routers into one or more wide area networks (WAN).

To manage heterogeneous networks, management protocols such as industry standard Simple Network Management Protocol (SNMP) and Open Systems Interconnection Common Management Information Protocol (OSI CMIP) have been developed. In addition to the management protocol used to communicate between the managing system and the managed system or device, a management information base (MIB) is defined that provides a set of common managed object definitions. MIB variables defined for, and associated with, a particular device can be collected and monitored and threshold values, if applicable, can be automatically determined for the variables monitored.

Figure 1:
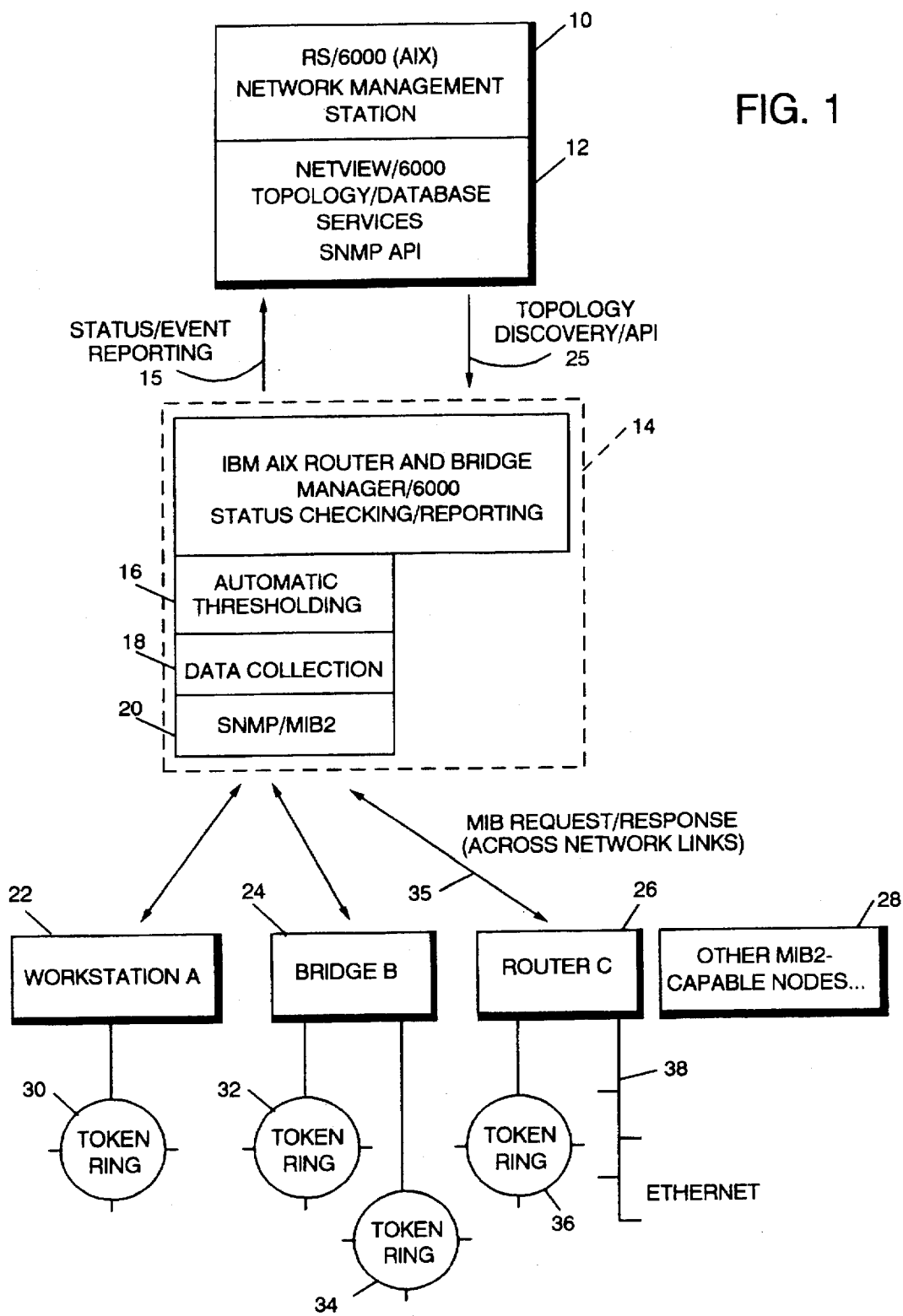
FIG. 1 schematically illustrates an embodiment of the invention environment for a RISC System/6000 processor operating as the network management station for communications to an SNMP-enabled communications network.

FIG. 1 illustrates a typical environment for an SNMP-enabled communications network in which the present invention is implemented. Network management station 10 is an IBM RISC System/6000 computer system running under the AIX operating system or a comparable processing platform. Although not specifically shown, it includes a monitor device to provide graphical and textual interface to a network operator, system administrator or other user of the network management platform. The network management platform depicted in FIG. 1 is the NetView/6000, or its successor, the NetView for AIX network management platform. Indicated by reference numeral 12, NetView/6000 provides both topology/database services and an SNMP application programming interface (API) for the IBM AIX Router and Bridge Manager/6000 network management application 14 in which the present invention is embodied. The topology/database services function provides network topology discovery capability; i.e., it determines which nodes exist in the network. The SNMP API function formats, sends and receives SNMP requests and responses over the network.

Logically positioned on top of the NetView/6000 platform 12, the Router and Bridge Manager 14 is launched from Netview/6000, sends SNMP requests and receives SNMP responses. SNMP requests, indicated by arrow 35, ask particular nodes on the network for information regarding specific variables. The set of variables supported by the Router and Bridge Manager 14 is a subset of MIB II, a standard defined by RFC 1213. The SNMP responses 35 sent by the node that has been polled to the Router and Bridge Manager 14 contains the values of the variables requested by the latter.

The variable values so received are collected and grouped by the data collection module 18 of the Router and Bridge Manager 14.

Data collection module 18, in conjunction with the automatic thresholding function 16, then determines the thresholds for these variables if automatic thresholding is enabled by the user. Automatic thresholding is performed on a per variable basis. In other words, it is left to the user's determination as to which variables are automatically thresholded. The data collection module 18, after grouping and thresholding the variables received, then calls upon the user interface module (not shown) of the Router and Bridge Manager 14 to display the information to the user and to propagate threshold statuses appropriately. Router and Bridge Manager 14 displays information in a color-coded manner, with green indicating normal values, yellow indicating marginal values (i.e., values exceeding a first, lower threshold) and red indicating critical values (i.e., values exceeding a second, higher threshold). The colors can be propagated to the NetView/6000 topology screen to graphically depict to the operator or user, the status of a particular network resource, as indicated by arrow 15.

The automatic thresholding invention described herein also includes scripts (sets of programming instructions) which enable a user to run any arbitrary function or set of functions in response to a threshold being exceeded. The scripts can be customized by the user to deal with a specific situation occurring. For example, the user can write a script to have a modem attached to the network management station 10 dial an emergency beeper number if a node on the network becomes critical.

Router and Bridge Manager 14 can poll and threshold variables from any reachable node on the SNMP-enabled network supporting a standard subset of MIB II variables through SNMP/MIB2 interface function 20. The network nodes connected to a network management station 10 include workstation 22, bridge 24, router 26 and other SNMP/MIB-II capable nodes 28. To further illustrate the environment of the invention, connected to the aforementioned nodes are token ring LANs 30, 32, 34, 36 and Ethernet LAN 38.

Figure 2:
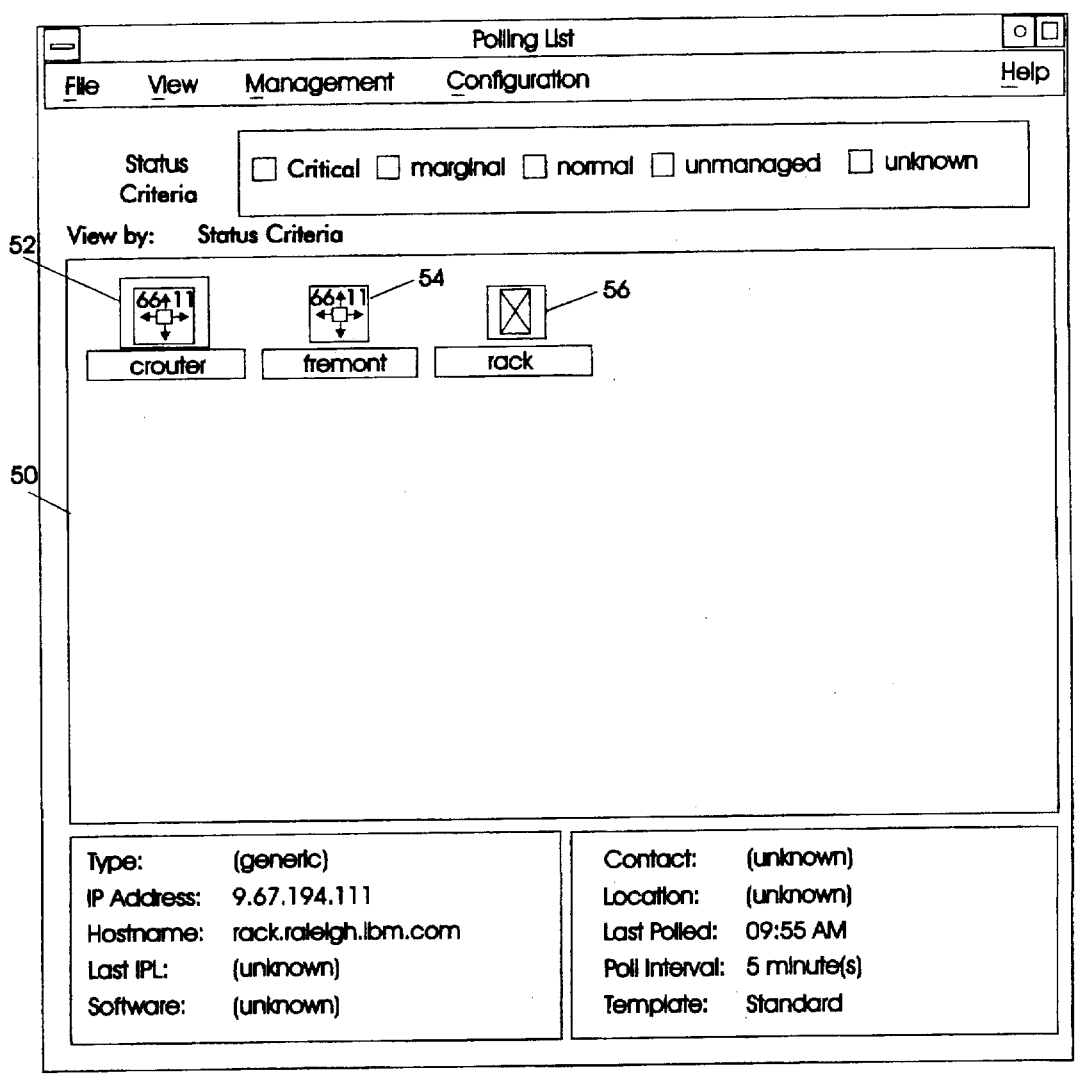
FIG. 2 is an operator interface screen display associated with the network management application that identifies all polled nodes of the network.

FIG. 2 is a user screen of the Router and Bridge Manager 14 and identifies all of the nodes that are currently being polled by this network management application. Color coding is used to indicate the status of a particular node based on threshold values of variables. Auto thresholding may or may not be applied to any of the network nodes depicted in window 50. Shown in the window are icons for router ("crouter") 52, router ("fremont") 54, and an hourglass icon 56 for a node ("rack") that is in the process of discovery by the Router and Bridge Manager 14.

Figure 3:
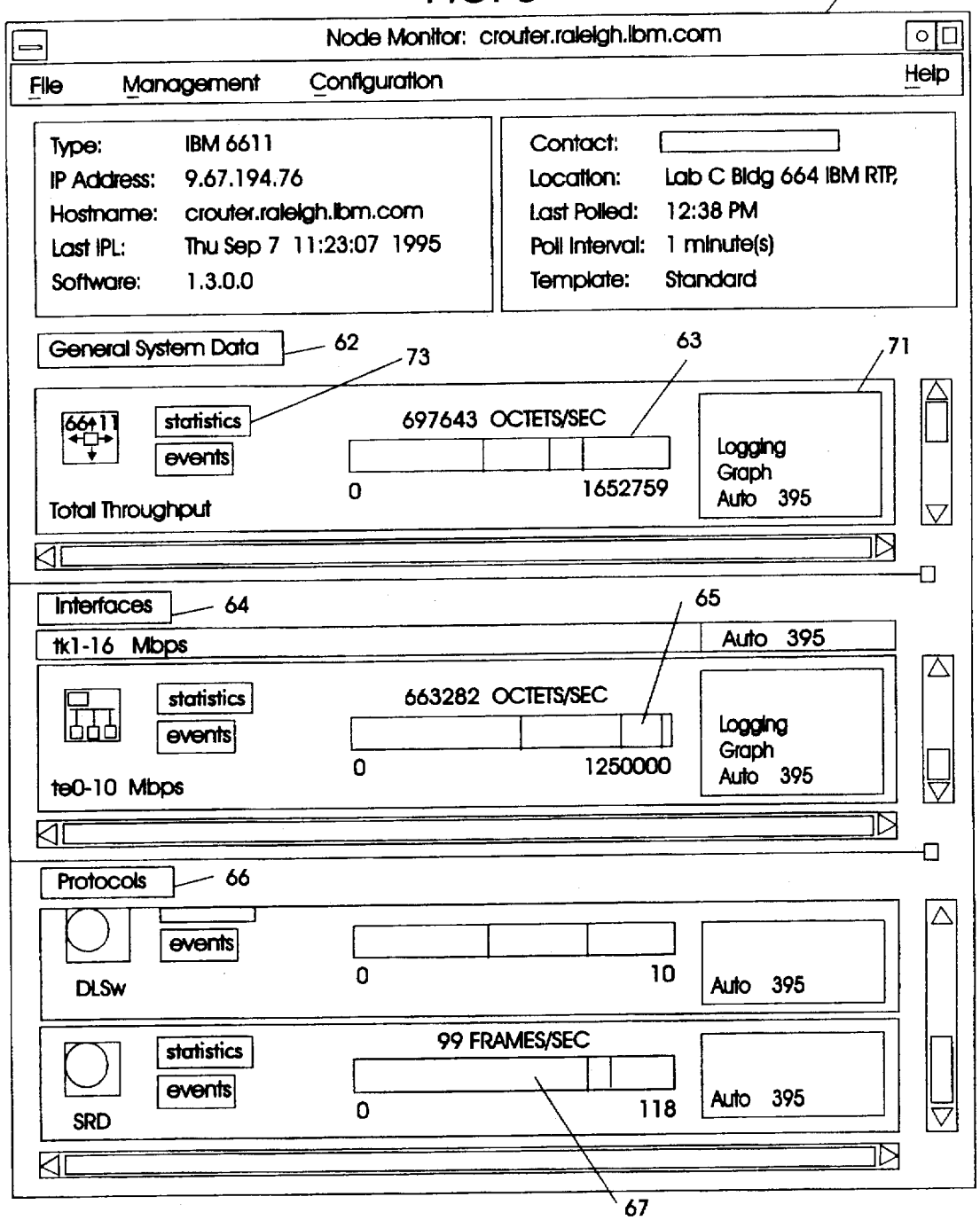
FIG. 3 is a node monitor screen display showing the status of a particular node in the network

The node monitor screen 60 of the Router and Bridge Manager 14 is shown in FIG. 3. The screen displays the status of a particular node in the network, in this instance, router ("crouter") 52. There are three main sections on this display—general system data 62, interfaces 64 and protocols 66, each of which is divided into "slices"; e.g., total throughput in the general system data section. Each slice has a meter that is associated with it as represented by the bar graphs 63, 65, 67 in FIG. 3. Each meter indicates the last value collected for that variable, the marginal and critical thresholds represented by the vertical lines, and the low and high values (the range) of the meter. The box 71 on the right side of each slice representation contains an indicator of the current flags corresponding to that slice. In this box, "auto" indicates that a slice is being thresholded automatically. This also implies that the marginal and critical thresholds displayed on the meter will vary with each new data sample as the node's variables are polled. Adjacent to "auto" is a number that indicates the total number of data samples that have been collected for automatic thresholding.

Each slice has a statistics button 73 associated with it which, when selected by the user, opens a window of several more variables which are combined to arrive at an aggregate status for that slice. Each of these additional variables has a graphical representation that is similar to the slices depicted in FIG. 3.

Figure 4:
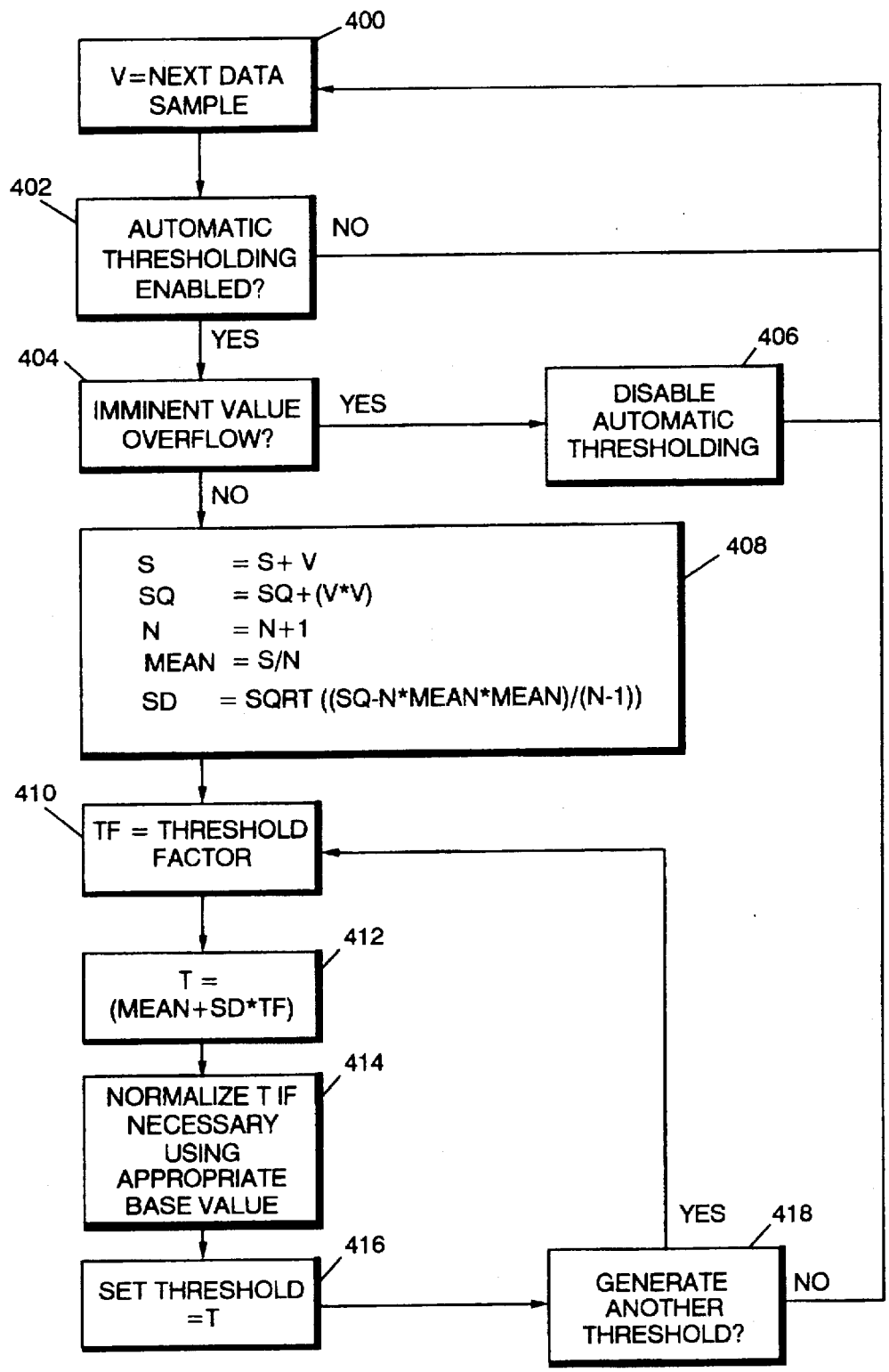
FIG. 4 illustrates a flowchart describing the algorithm used for automatic threshold determination.

FIG. 4 is a flowchart representing the algorithm implemented by this invention. The algorithm automatically determines reasonable threshold values for any particular datastream and then uses the automatically determined value to set the thresholds for a counter or gauge without user intervention. The algorithm is reapplied to each counter or gauge every time a new data sample is available for that counter or gauge to set new thresholds. This allows the thresholds to continuously adapt to changing data. Although at first the threshold is relatively unstable and prone to wide variations due to the lack of historical data, these variations tend to diminish as more and more data samples are consumed, thus stabilizing the threshold. Assuming a normal distribution of incoming data samples, the threshold will eventually converge to a stable value, at which point the automatic thresholding mechanism may be manually frozen at the current threshold value for a particular meter or gauge.

In block 400, the next data sample for a particular counter or gauge is received. In decision block 402, a test is made to determine if automatic thresholding is enabled for the monitored counter. If it is, then in decision block 404, a test is made to determine if there is an imminent value overflow for the variables associated with the counter that are maintained for threshold determination. If in decision block 402, automatic thresholding for the counter is found to be disabled, the algorithm loops back to logical block 400 to await the next data sample.

There is a limitation to this algorithm that is inherently based on the physical limitations of the supporting operating environment. All operating environments have limits on the amount of storage which a variable may consume, and it is possible that one of the variables associated with the counter for threshold determination may exceed the storage allocation. Thus, if in decision block 404 a value overflow condition is found to be imminent, automatic thresholding is disabled in block 406 and the algorithm loops back to logic block 400 to await the next data sample. Otherwise, the algorithm proceeds to logic block 408 where the application updates a small set of variables associated with each counter or gauge to be monitored and computes the mean and standard deviation for the sampled data. The algorithm adds the current data sample obtained in logic block 400 to the accumulated sum of previous sample values to arrive at a running summation S of all data samples collected. The value of the current data sample is also squared and added to the sum of the squared values for previous sample values to arrive at a running summation, SQ, of the square of all data samples collected. The number of samples collected is incremented by one and the mean (MEAN) and standard deviation (SD) of all sampled data are computed.

In logic block 410, the threshold factor, TF, is read for a particular counter and in logic block 412, the threshold for the counter is determined by multiplying the threshold factor by the standard deviation and adding the result to the mean of the sample values. The current threshold value is the mean value of the sampled data plus the threshold factor TF applied to the standard deviation. Different (multiple) threshold levels can be established by varying the value of TF. A value of 1.0, for example, sets the threshold to one standard deviation above the mean, indicating that approximately 68% of the data sampled falls below the threshold. Larger values of TF imply larger percentages of sampled data falling below the threshold.

The threshold generated by the algorithm in logic block 412 is measured in the same units as the sampled data. Logic block 414 enables normalization of this threshold value against a base value so that the threshold can represent a percentage of the base value.

In logic block 416, the threshold for the counter or gauge is set. The algorithm proceeds to decision block 418 where a test is made to determine if another threshold needs to be generated. If another threshold does not need to be generated, the algorithm loops back to logic block 400 to await the arrival of the next data sample. To determine another threshold value, the algorithm loops back from decision block 418 to logic block 410 to read another threshold factor. The algorithm can be used to generate multiple thresholds for a single counter. One value of the threshold factor TF could be used to establish a warning level threshold for a counter and a second value (presumably higher) of TF could be used to establish a critical threshold.

As an example, consider a situation in which the network management application is monitoring a counter named $Packets_{13}$ In for a particular node in the network, and the following samples have been collected so far (measured in packets/minute):

3503, 3488, 3767, 3246, 3345, 3221, 3400, 3050, 3296, 3006

This counter contains the following values after the last data sample:

$S = 33,322$
$SQ = 11,489,976$
$N = 10$

Assume further, that the application needs two thresholds, one for warning values and one for critical values, and that the corresponding threshold factors are:

$TF_{warning} = 1.0$
$TF_{critical} = 2.0$

To derive the thresholds $T_{warning}$ and $T_{critical}$, the algorithm is applied as follows:

$$\begin{aligned}
MEAN &= S/N \\
&= 33,322/10 \\
&= 3,332.2 \\
SD_{approx} &= SQUARE\_ROOT\,((SQ - \\
&\quad (N*MEAN*MEAN))/(N-1)) \\
&= SQUARE\_ROOT(50489.7330) \\
&\approx 224.70 \\
T_{warning} &= (MEAN + SD_{approx}*TF_{warning}) \\
&= 3556.9 \\
T_{critical} &= (MEAN + SD_{approx}*TF_{critical}) \\
&= 3781.6
\end{aligned}$$

Based on the historical data, these two thresholds will be set in the network management application without any intervention required on the part of the user, and these thresholds will be applied to the next data sample in determining the status of the counter or gauge in question. After this determination, the next data sample is used to recalculate new thresholds adaptively.

Figure 5:
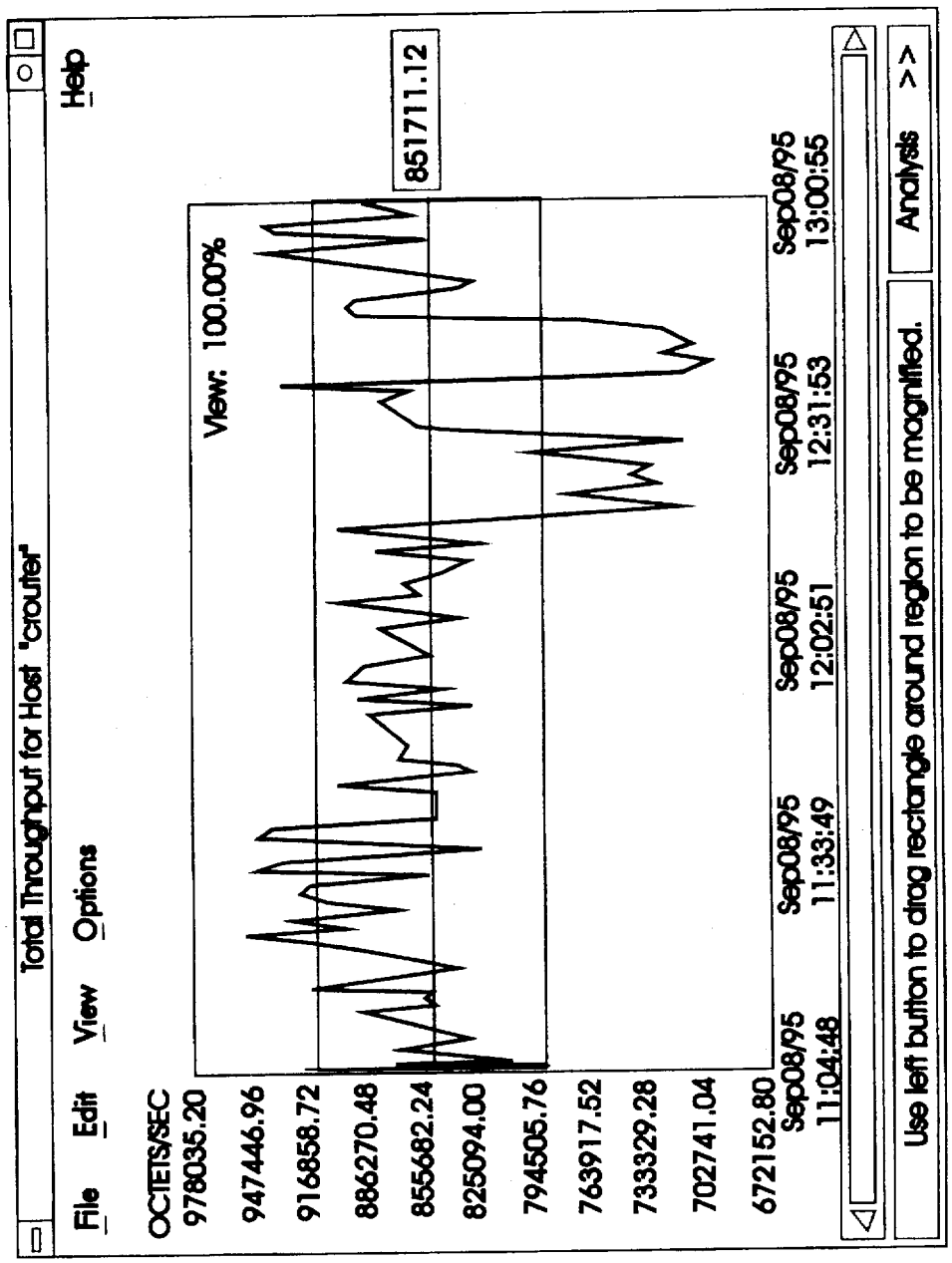
FIG. 5 is a graphical display of the values of a threshold variable over a time interval during which sample values of the variable are collected or accumulated.

A graphing utility in Router and Bridge Manager 14 enables the user to display the historical representation of thresholded variables associated with a network node. Illustrated in FIG. 5 is a network router's ("crouter") total traffic over a period of two hours, measured in octets (bytes) per second. The horizontal line through the middle of the data displayed is the mean value for the data (851711.12 octets/sec.). The region between the horizontal lines above and below the mean value line displays all data within ±1 standard deviation from the mean value. Any data sample above this region exceeds the marginal threshold for the variable displayed. As more data samples arrive, the mean and standard deviations are updated, thus making the threshold adaptive. This region will always hold most of the data samples; in this way, the user is guaranteed that the thresholds will only be exceeded when node behavior, as measured by MIB variables, varies significantly from the norm (mean value) as established by historical values for these variables.

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as Letters Patent is as follows:

1. A method for automatically determining and adaptively updating thresholds without user intervention in a communications network including a network management station running a network management application and having at least one processor, said network containing a plurality of network nodes, said method comprising the steps of:

selecting at least one variable for each of said plurality of network nodes that is to have a threshold value determined automatically and adaptively updated;

receiving a plurality of data sample values for said at least one variable that is to have said threshold value determined automatically;

accumulating based on each data sample value received, a first sum of each data sample value received and a second sum of the square of each data sample value received and then discarding said each data sample received;

determining a mean value and a standard deviation for said at least one variable based on said first sum, said second sum and a total number of data sample values received;

setting at least one threshold value for said at least one variable by scaling said standard deviation by a threshold factor and adding the result to said mean value; and graphically displaying a meter depicting said data sample value received and said at least one threshold value.

2. The method of claim 1 wherein said communications network is SNMP-enabled and includes at least one network router node connected by a communications link to said network management station.

3. The method of claim 1 wherein said communications network is SNMP-enabled and includes at least one network bridge node connected by a communications link to said network management station by a network bridge node.

4. The method of claim 1 wherein a first lower threshold value for said at least one variable is determined by scaling using a first threshold factor and a second, higher threshold value is determined by scaling using a second threshold factor.

5. The method of claim 4 wherein said displayed meter is a bar graph representation of said at least one variable and includes a minimum value, a maximum value, said first threshold value, said second threshold value and a current data sample value.

6. The method of claim 1 further comprising the step of polling each of said plurality of network nodes for an update on all thresholded variable values monitored at said each node and transmitting said all thresholded variable values to said network management station for node status determination.

7. The method of claim 1 wherein said graphically displayed data sample value is color encoded based on a comparison with said at least one threshold value for said at least one variable.

8. The method of claim 1 further comprising the step of disabling automatic thresholding and maintaining said at least one threshold value at a current setting if said second sum exceeds a maximum number that can be represented by said at least one processor at said network management station.

9. The method of claim 1 further comprising executing a script of programming instructions if the data sample value received exceeds said at least one threshold value.

10. A system for automatically determining and adaptively updating thresholds without user intervention for at least one selected variable at a network node in a communications network including a network management station running a network management application and having a processor, said network containing a plurality of network nodes, said system comprising:

a transmitter at said network management station for sending a polling request to each of said plurality of network nodes to sample a plurality of variables at said each network node that are thresholded and monitored;

a receiver at said network management station for receiving a response to said polling request from each of said plurality of network nodes, said response including data sample values for each of said plurality of variables that are thresholded;

accumulating means in said network management application for said at least one selected variable for storing and updating a first sum of each data sample value received, a second sum of the square of each data sample value received, and a total number of data sample values received, said each data sample value then being discarded;

statistics generating means in said network management application for determining a mean value and a standard deviation for said at least one selected variable based on said first sum, said second sum and said total number of data sample values received;

threshold setting means in said network management application for scaling said standard deviation and combining the result with said mean value to set and adaptively update said at least one threshold value; and a display for graphically presenting to a user a meter depicting for said at least one selected variable each said data sample value received and said at least one threshold value.

11. The system of claim 10 wherein said communications network is SNMP-enabled and includes at least one network router connected by a communications link to said network management station.

12. The system of claim 10 wherein said communications network is SNMP-enabled and includes at least one network bridge connected by a communications link to said network management station.

13. The system of claim 10 wherein said display represents said meter associated with said at least one selected variable with a bar graph, said bar graph depicting a minimum value, a maximum value, a current data sample value and said at least one threshold value.

14. The system of claim 10 further comprising means in said network management application for disabling automatic thresholding and maintaining said at least one threshold value at a current setting if said second sum exceeds a maximum number that can be represented by said processor at said network management station.

* * * * *